United States Patent
Oroskar et al.

(10) Patent No.: US 11,902,948 B1
(45) Date of Patent: Feb. 13, 2024

(54) ADAPTIVE PRIMARY COMPONENT CARRIER SWITCHING IN MASSIVE MIMO BASED ON BEAMFORMING CALIBRATION STATUS

(71) Applicant: T-Mobile Innovations LLC, Overland Park, KS (US)

(72) Inventors: Siddharth S. Oroskar, Overland Park, KS (US); Jasinder P. Singh, Olathe, KS (US); Ravi Kallepalli, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 325 days.

(21) Appl. No.: 16/206,536

(22) Filed: Nov. 30, 2018

(51) Int. Cl.
*H04W 72/0453* (2023.01)
*H04B 7/0413* (2017.01)
*H04W 88/02* (2009.01)
*H04W 88/08* (2009.01)

(52) U.S. Cl.
CPC ...... *H04W 72/0453* (2013.01); *H04B 7/0413* (2013.01); *H04W 88/02* (2013.01); *H04W 88/08* (2013.01)

(58) Field of Classification Search
CPC . H04W 72/0453; H04W 88/02; H04W 88/08; H04W 36/06; H04W 72/085; H04W 88/10; H04W 84/045; H04W 88/06; H04B 7/0413
See application file for complete search history.

(56) References Cited

U.S. PATENT DOCUMENTS

| 2010/0322185 | A1* | 12/2010 | Park | H04W 72/085 370/331 |
| 2011/0105136 | A1* | 5/2011 | Choi | H04W 48/08 455/452.1 |
| 2012/0115468 | A1* | 5/2012 | Lindoff | H04W 36/06 455/434 |
| 2012/0182879 | A1* | 7/2012 | Tamura | H04L 5/001 370/242 |
| 2013/0022016 | A1* | 1/2013 | Wei | H04L 5/0007 370/329 |

(Continued)

FOREIGN PATENT DOCUMENTS

WO WO-2018013110 A1 * 1/2018 ............ H04W 36/08

*Primary Examiner* — Michael Thier
*Assistant Examiner* — Jose L Perez
(74) *Attorney, Agent, or Firm* — Shook, Hardy & Bacon L.L.P.

(57) ABSTRACT

Methods, systems, and media for improving pairing of user equipment (UE) in a Massive multiple-input multiple-output (MIMO) system using carrier aggregation are provided. Component carriers (CC) used for communication with UEs in the network may undergo routine beamforming calibration checks to determine if the CCs are calibrated. If a CC fails calibration, then UEs that communicate with the CC as their primary component carrier (PCC) may not be receiving the high data throughput typically experienced through the PCC. In response to determining that a CC fails calibration, a computing device may pair UEs with another CC as their PCC until the original CC passes a calibration check. The computing device may determine which CC to pair to the UEs based on uplink capacity, bandwidth, or a passed calibration check.

15 Claims, 5 Drawing Sheets (56) References Cited

U.S. PATENT DOCUMENTS

| | | | | |
|---|---|---|---|---|
| 2014/0161058 A1* | 6/2014 | Sundaresan | ............ | H04L 5/001 370/329 |
| 2015/0050941 A1* | 2/2015 | Sawada | ................ | H04W 36/06 455/452.2 |
| 2015/0230233 A1* | 8/2015 | Kobayashi | ............. | H04L 5/001 370/329 |
| 2015/0288467 A1* | 10/2015 | Kahrizi | .................. | H04L 5/001 370/241 |
| 2015/0341945 A1* | 11/2015 | Panchal | ................. | H04L 5/003 370/329 |
| 2016/0088635 A1* | 3/2016 | Davydov | ............. | H04L 1/1812 370/329 |
| 2016/0227542 A1* | 8/2016 | Chen | ..................... | H04W 72/00 |
| 2017/0013622 A1* | 1/2017 | Taylor | ................... | H04W 72/52 |
| 2017/0238316 A1* | 8/2017 | Li | ...................... | H04W 72/0453 370/329 |
| 2018/0006775 A1* | 1/2018 | Li | ......................... | H04W 72/02 |
| 2018/0115357 A1* | 4/2018 | Park | ....................... | H04L 5/005 |
| 2018/0220365 A1* | 8/2018 | Fang | ..................... | H04W 72/04 |
| 2019/0053237 A1* | 2/2019 | Rico Alvarino | ...... | H04L 5/0048 |
| 2019/0081687 A1* | 3/2019 | Sadiq | ................ | H04W 74/0833 |
| 2019/0098607 A1* | 3/2019 | Zhang | .................. | H04L 5/0098 |
| 2019/0150011 A1* | 5/2019 | Shoji | ..................... | H04W 76/27 370/329 |
| 2019/0253127 A1* | 8/2019 | Kang | .................... | H04L 5/0048 |
| 2019/0356371 A1* | 11/2019 | Osawa | ................. | H04W 88/02 |
| 2019/0357193 A1* | 11/2019 | Bai | ....................... | H04W 72/10 |
| 2020/0178182 A1* | 6/2020 | Raghavan | ........... | H04W 52/143 |
| 2020/0187208 A1* | 6/2020 | Hou | ..................... | H04L 5/0032 |
| 2020/0374960 A1* | 11/2020 | Deenoo | ............. | H04W 72/1284 |
| 2021/0160818 A1* | 5/2021 | Chae | .................... | H04W 28/26 |
| 2022/0158891 A1* | 5/2022 | Zhou | ..................... | H04W 76/27 |

\* cited by examiner

ADAPTIVE PRIMARY COMPONENT CARRIER SWITCHING IN MASSIVE MIMO BASED ON BEAMFORMING CALIBRATION STATUS

SUMMARY

At a high level, aspects described herein relate to systems, methods, and media for improving user equipment (UE) pairing to a primary component carrier (PCC) in a Massive multiple-input multiple-output (MIMO) network. In Massive MIMO networks, UEs often utilize the high data throughput benefits afforded by carrier aggregation. In carrier aggregation, UEs may communicate with multiple component carriers (CCs)—a communication component or frequency that transfers data over a portion of the network's frequency band. Although a UE may communicate with multiple CCs, the UE may generally communicate with only one as its PCC, which is normally where the highest data transfer is realized. The UE may communicate with other CCs as secondary carrier components (SCCs) that serve as auxiliary carriers to boost data rates.

To ensure the beamforming status of a CC is calibrated, CCs may undergo routine calibration checks. If it is not calibrated, then the CC may fail the calibration check. Where a CC is not calibrated, a UE that communicates to it may not receive the high data transfer benefits afforded by the PCC in the Massive MIMO network. To alleviate this problem, the present technology provides for pairing the UE with another CC as its PCC in response to its original PCC failing a calibration check. The UE may continue to communicate with the new PCC until its original PCC passes a subsequent calibration check. When its original PCC passes the subsequent calibration check, the UE may be paired back with the original CC as its PCC.

In some cases, when a CC fails a calibration check, there may be more than one CC available to pair with a UE as its PCC. In such cases, a computing device communicating with the CCs may determine which CC to pair the UE with as its PCC. This may be done based on an available bandwidth or uplink capacity of another CC. It may also be based on another CC passing a calibration check.

Accordingly, one aspect is directed to a system for improving pairing of a UE in a Massive MIMO network. The system comprises a base station that has at least three CCs. The at least three CCs include a first CC, a second CC, and a third CC. The system further comprises a computing device that is in communication with the base station. The computing device determines that a UE is paired to the first CC as a PCC, and performs a first calibration check on the first CC. The computing device further determines that the first CC fails the first calibration check, and based on the first CC failing the first calibration check, it pairs the UE with the second CC as the primary component carrier.

Another aspect provides for computer storage media that stores computer-usable instructions. When executed by a processor, the computer-usable instructions cause operations that include performing a first calibration check on a first CC of a plurality of CCs, and determining that the first CC of the plurality of CCs fails a first calibration check. Based on the first CC failing the first calibration check, a UE is paired with a second CC of the plurality of CCs as a primary CC.

In yet another aspect, a method for improving pairing of a UE in a Massive MIMO system is provided. The method comprises performing a first calibration check on a first CC of a plurality of CCs, and determining that the first CC fails a first calibration check. The method further comprises identifying a first UE communicating with the first CC as a primary CC, and based on the first CC failing the first calibration check, the first UE is paired with a second CC of the plurality of CCs as the PCC.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be provided in part in the Detailed Description, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Throughout this disclosure, several acronyms and shorthand notations are used to aid in the understanding of certain concepts. These acronyms and shorthand notations are intended to help provide an easy methodology of communicating the ideas expressed herein, and are not meant to limit the scope of the present disclosure and technology. The following is a list of the acronyms:

CA Carrier Aggregation
CC Component Carrier
CDMA Code Division Multiple Access
eNodeB Evolved Node B
FDD Frequency-Division Duplexing
gNodeB Next Generation Node B
GSM Global System for Mobile Communications
HSDPA High Speed Downlink Packet Access
LTE Long Term Evolution
MIMO Multiple-input Multiple-output
NR New Radio
PCC Primary Component Carrier
SCC Secondary Component Carrier
TDD Time-Division Duplexing
UE User Equipment UMTS Universal Mobile Telecommunications System
VoIP Voice over Internet Protocol
WCDMA Wideband Code Division Multiple Access
WiMax Worldwide Interoperability for Microwave Access Further, various technical terms are used throughout this description. An illustrative resource that describes these terms may be found in Newton's Telecom Dictionary, 27th Edition (2012).

In general, the present technology relates to increasing UE pairing with a PCC in wireless communication networks using Massive MIMO technologies. In Massive MIMO networks, carrier aggregation is generally utilized to increase the bandwidth across which UEs communicate. This increase in bandwidth allows for faster uplink and downlink data rates experienced by the UEs. Carrier aggregation technologies may be applied with TDD, FDD, and the like.

A "UE" is a device that has the capability of using the wireless communications network. A UE may take on a variety of forms, such as a personal computer, a smart phone, a smart watch, a laptop computer, a mobile phone, a mobile device, a tablet computer, a wearable computer, a personal digital assistant, a server, a CD player, an MP3 player, a global positioning system device, a video player, a handheld communications device, a workstation, a router, an access point, or any other device capable of wireless communication.

Carrier aggregation includes a UE communicating with an aggregation of multiple CCs across an available spectrum. A CC is the communication component of an antenna, and it communicates across a frequency within a spectrum band of the network. Thus, in some cases, a CC may be embodied not as a physical component, but as frequency range within an overall bandwidth. As an example, band 41 may be a 2.5 GHz band. CCs may communicate across portions of the 2.5 GHz band. Each CC may communicate across a frequency of 20 MHz or a frequency of up to 20 MHz within the 2.5 GHz band. In specific examples, CCs may communicate across 1.4 MHz, 3 MHz, 5 MHz, 10 MHz, 15 MHz, or 20 MHz portions of the band. CCs may also communicate across variable portions of the band, such as variable bandwidths used in 5G technologies. For example, one CC may communicate across a 10 MHz portion of the band, while another CC communicates across a 20 MHz portion of the 2.5 GHz band.

UEs in the wireless communications network that are capable of taking advantage of carrier aggregation technologies may communicate with more than one CC at any given time. In a Massive MIMO network, a UE communicates with one CC as a PCC and communicates with other CCs as SCCs. A UE that is communicating with a CC as a PCC may be considered "paired" with the CC as its PCC. For example, a 3CA UE in the network may be paired with one CC as its PCC, while it also may communicate with two other CCs as SCCs. Generally, the PCC is the main carrier while the SCCs are auxiliary carriers that boost data rates. The PCC serves to transfer the highest data volume, while the SCCs are primarily used for bandwidth expansion. The number of SCCs that a UE communicates to may be determined by the UE's capabilities, e.g., a 2CA, a 3CA, a 5CA, etc. device.

The general use of carrier aggregation technologies in Massive MIMO networks includes calibrating the CCs. Calibration checks may be performed by a computing device to determine if a CC is properly calibrated. The CC may be properly calibrated when there is a reciprocity between the uplink and downlink channels. If so, the CC may pass the calibration check. Calibration checks may be performed periodically or as needed. For example, the computing device may perform a calibration check every 30 minutes. Calibration checks may be performed in up to 5 minute intervals, up to 10 minute intervals, up to 15 minute intervals, up to minute intervals, up to 25 minute intervals, or up to 30 minute intervals. In some cases, a CC may fail a calibration check, such as when there is a break end the end-to-end uplink or downlink channel reciprocity. In some cases, a calibration action may be taken to restore reciprocity based on the failed calibration check.

For those UEs paired with a PCC that does not pass a calibration check, the UEs may not be receiving the higher data volume benefits of Massive MIMO. Thus, UEs that continue to be paired with a PCC that failed the calibration check may continually fail to receive Massive MIMO benefits until the PCC passes a subsequent calibration check.

To alleviate this problem and to increase the chances that a UE in a wireless communications network pairs with a CC as a PCC that may pass a calibration check, the present technology describes pairing the UE with a different CC as its PCC in response to a failed calibration check. When the UE's original PCC fails the calibration check, the UE may be paired with a different CC as its PCC until its original CC passes the calibration check. When the original CC passes the calibration check, the UE may then be paired back with its original CC as its PCC. Thus, the UE may continue to receive the benefits of the Massive MIMO system during the time that its original CC experiences a failed calibration check.

Using an example, a UE may be a 3CA capable device. The UE may be paired with a first CC as its PCC, and it may also be communicating with a second CC and a third CC as its SCCs. A computing device may perform a calibration check on the first CC, and the first CC may fail the calibration check. In response to the failed calibration check, the UE may be paired with the second CC as its PCC. In some cases, the UE may continue to communicate with the first CC as an SCC. To pair the UE with the second CC, the computing device may send a reconfiguration message to the UE that instructs the UE to communicate over the portion of the frequency band corresponding to the second CC as its PCC.

By pairing the UE with the second CC as its PCC, the UE can still receive benefits of Massive MIMO, even after the first CC failed the calibration check. Thus, the chances that the UE pairs with a CC as a PCC is increased because it is paired with the second CC as its PCC in response to the first CC failing the calibration check. Over a Massive MIMO network where there are many UEs communicating with multiple CCs, this method improves the probability that each UE in the network will receive the benefits of the Massive MIMO technology at any given time.

After the UE has been paired with another CC as a PCC based on a failed calibration check, it may continue to be paired with the other CC as its PCC until its original CC passes a calibration check, in which case, it may be paired back with the original CC as its PCC. Continuing with the example above, after the first CC fails the calibration check, the UE may continue to communicate with the second CC as its PCC until the first CC passes a subsequent calibration check. In response to the first CC passing the subsequent calibration check, the computing device may pair the UE with the first CC as its PCC. The UE may then communicate with the second CC and the third CC as its SCCs. To pair the UE with the first CC as its PCC, the computing device may send a reconfiguration message to the UE in response to the passed calibration check that instructs the UE to communicate over the portion of the frequency band corresponding to the first CC as its PCC.

In some cases, after a PCC paired with a UE fails a calibration check, the computing device may pair the UE with another CC as its PCC base on an uplink capacity or bandwidth of the other CC, based on the other CC passing a calibration check, or any combination of these factors.

For instance, an uplink capacity or a bandwidth of a CC may be determined, and the UE may be paired with the CC as its PCC based on the uplink capacity or the bandwidth of the CC. The UE may be paired with the CC that has a greater uplink capacity, that has a greater bandwidth, or based on a combination of both. In 4G systems, the UE may be paired to a CC as its PCC based on the uplink capacity of the CC. In 5G systems, the UE may be paired to a CC as its PCC based on the uplink capacity, bandwidth, or both, as CCs in 5G telecommunications networks may have variable bandwidths for communicating with UEs.

Using the example above, the uplink capacity or the bandwidth may be determined for each CC in an antenna, including the first CC, the second CC, and the third CC. If the first CC fails calibration, then the UE may be paired with the second CC as its PCC if the uplink capacity or the bandwidth of the second CC is greater than the third CC.

In some cases, the UE may be paired with a CC as its PCC based on the CC passing calibration. For example, if the first CC fails a calibration check, it may be determined whether the second CC and the third CC have passed a calibration check. If the second CC passed the calibration check and the third CC did not pass the calibration check, the computing device may pair the UE with the second CC as its PCC.

In some cases, it may be determined whether the UE is capable of carrier aggregation. For instance, if the UE is not capable of carrier aggregation, then the UE may not be instructed to change communication bandwidths when a CC fails a calibration check. However, if the UE is capable of carrier aggregation, and its PCC does not pass a calibration check, then the UE may be instructed to begin communicating with another CC as its PCC based on the failed calibration check.

Figure 1:
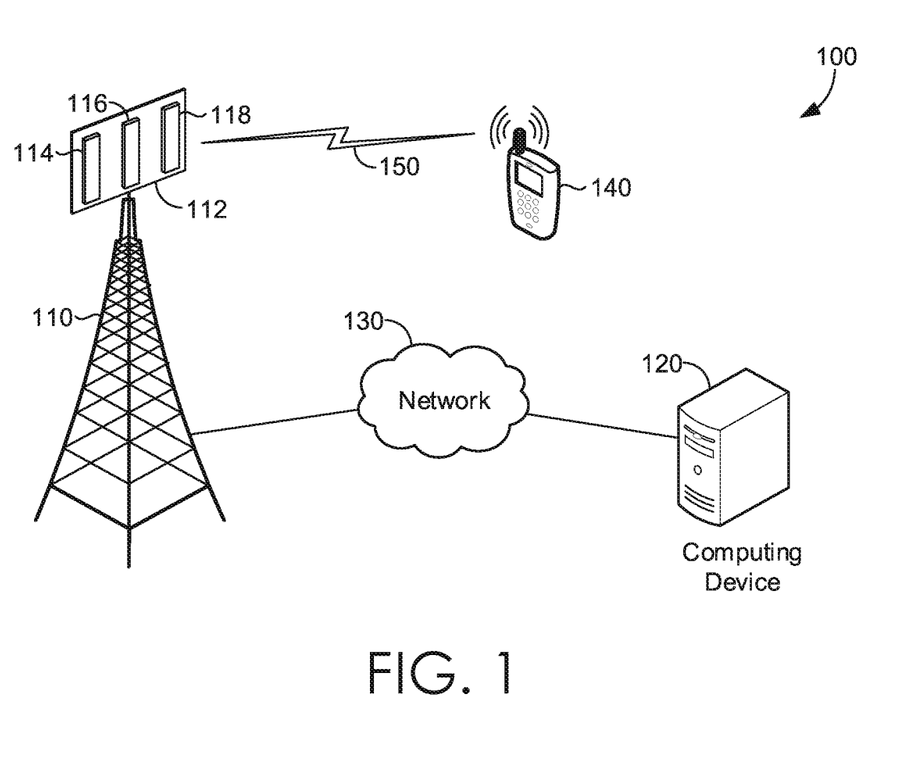
FIG. 1 is an example operating environment suitable for practicing embodiments of the present technology.

Referring now to the drawings in general, and initially to FIG. 1, an example operating environment 100 is provided. Environment 100 is only one example of a suitable operating environment and is not intended to suggest any limitation as to the scope of use or functionality of the technology. Neither should the network environment be interpreted as having any dependency or requirement relating to any one or combination of components illustrated.

Example operating environment 100 is illustrated in FIG. 1 as including base station 110. Base station 110 includes antenna 112 having first CC 114, second CC 116, and third CC 118. Base station 110 communicates with computing device 120 via network 130. Base station 110 is also shown as communicating with UE 140 via signal 150.

Base station 110 may be part of a telecommunications network. A telecommunications network might include an array of devices or components (e.g., one or more base stations), base transmitter stations, radios, antennas, transmitters/receivers, digital signal processors, control electronics, GPS equipment, and the like, some of which are not shown. Those devices or components may form network environments similar to what is shown in FIG. 1, and may also perform methods in accordance with the present disclosure. Components such as terminals, links, and nodes (as well as other components) can provide connectivity in various implementations. While base station 110 is illustrated as a stand-alone tower, it will be recognized that base station 110 or components of base station 110 may be placed in more non-traditional locations, such as light poles, sides of buildings, within buildings, on geographical structures, and so forth. As used herein, a base station may include a collection of components that are distributed in nature, e.g., one component may be in one location while another component may be in another, each working together in the communications network. In some cases, a base station may be referred to an eNodeB or gNodeB, such as those used in 4G networks and 5G networks, respectively. A network can include multiple networks, as well as being a network of networks. FIG. 1, however, is illustrated in a simple form so as to not obscure other aspects of the present disclosure.

A network can be part of a telecommunications network that connects subscribers to their immediate service provider. In some instances, a network can be associated with a telecommunications provider that provides services (e.g., LTE) to user devices, such as user device 140. For example, the network may provide voice services to user devices or corresponding users that are registered or subscribed to utilize the services provided by the telecommunications provider. The network can comprise any communication network providing voice or data service(s), such as, a 1x circuit voice, a 3G network (e.g., CDMA, CDMA2000, WCDMA, GSM, UMTS), a 4G network (e.g., WiMAX, LTE, HSDPA), or a 5G network (e.g., NR). While the present disclosure is described with reference to 4G network and 5G network, it is contemplated that features of the present technology may be employed with use in other networks as well.

As indicated, base station 110 may communicate with UE 140 via signal 150. In some cases, base station 110 may communicate with UE 140 using beamforming techniques. In general, beamforming is a signal processing technique for directional signal transmission or reception. When it is desired to change the directionality of an array when transmitting radio frequency signal from an antenna at a cell site, a beamformer controls the phase and relative amplitude of the signal, such as signal 150.

As illustrated, operating environment 100 is suitable for use in a wireless telecommunications network that is employing Massive MIMO technology. That is, base station 110 includes antenna 112 having an array of multiple CCs, including first CC 114, second CC 116, and third CC 118. As previously indicated, the CC is a communication component that communicates across a portion a spectrum band. This communication is illustrated by signal 150. Using carrier aggregation, UE 140 may communicate with more than one CC simultaneously.

While the multiple CCs are illustrated as components of a single antenna 112, it will be recognized that there are other arrangements of CCs that may be used. There may be cases where the CCs are distributed, such as CCs that are associated with different base stations or are in different locations. In some cases, the CCs may be grouped together in a non-distributed fashion, such as on the side of a building, and may take the form of various array patterns.

Additionally, base station 110 is illustrated as communicating with computing device 120 via network 130. Although computing device 120 is illustrated remote from base station 110, computing device 120 may also be located at base station 110 or included in components of base station 110. An example computing environment suitable for use as computing device 120 is described below with reference to FIG. 7. Network 130 may include, without limitation, one or more local area networks (LANs) or wide area networks (WANs). In exemplary implementations, network 130 comprises the Internet or a cellular network, amongst any of a variety of possible public or private, wireless or non-wireless networks.

Figure 2A:
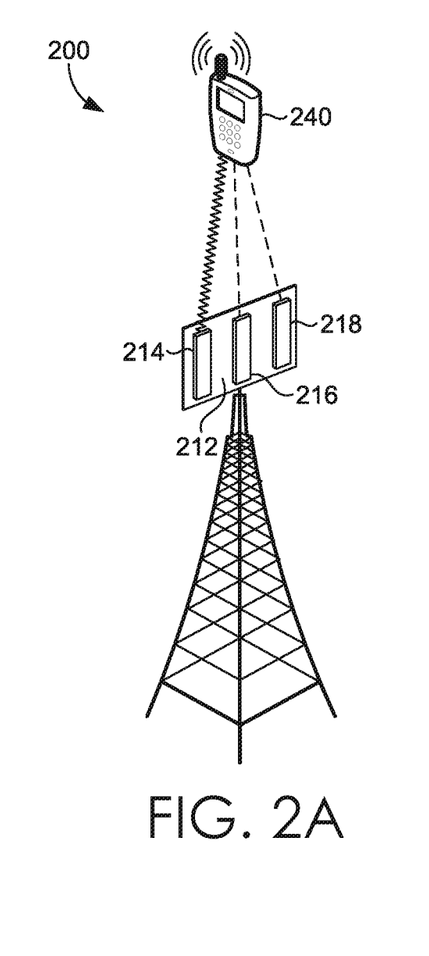
FIGS. 2A-2B illustrate example component carriers (CCs) having various carrier aggregation communication patterns with a user equipment (UE), in accordance with embodiments described herein.
Figure 2B:
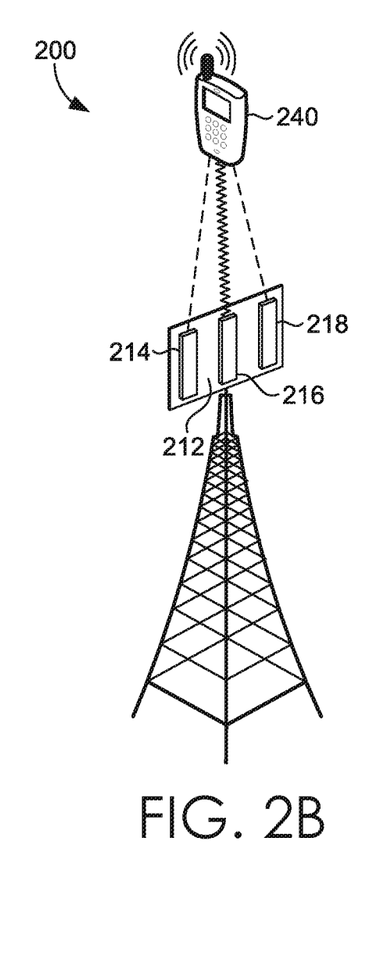

Operating environment 100 may be suitable for use in practicing implementations of the present disclosure, some of which are described with reference to FIGS. 2A-2B. FIGS. 2A-2B illustrate example CCs having various combinations of carrier aggregation with a UE. At a high level, FIGS. 2A-2B illustrate an example sequence of changing a PCC for UE 240 after a failed calibration check.

Generally, each of FIGS. 2A-2B illustrates example base station 200 having antenna 212. Antenna 212 is shown having first CC 214, second CC 216, and third CC 218. In some embodiments, antenna 212 may be considered emitting first CC 214, second CC 216, and third CC 218. Each of first CC 214, second CC 216, and third CC 218 is shown in communication with UE 240. By communication, it is meant that UE 240 is transferring information via wireless signals that correspond to a portion of the frequency spectrum associated with each CC. As previously noted, the CCs may communicate over a defined portion of the frequency spectrum or they may be communicating over a variable portion of the frequency spectrum. As illustrated in FIGS. 2A-2B, UE 240 is shown communicating with a CC as a PCC by a zig-zag line connecting UE 240 to a respective CC. UE 240 is illustrated as communicating with a CC as an SCC by a dashed line connecting UE 240 to a respective CC. While FIGS. 2A-2B illustrate a single group of CCs associated with antenna 212, first CC 214, second CC 216, and third CC 218 may be in any collective pattern or may be separated in a distributed fashion. Antenna 212 is shown having only three CCs; however, it may include more or less CCs (such as 5 CCs) in other embodiments.

Having this in mind, FIG. 2A illustrates a specific carrier aggregation communication pattern. Here, UE 240 is paired with first CC 214 as its PCC. UE 240 is further communicating with second CC 216 and third CC 218 as SCCs. As noted, CCs may undergo regular calibration checks. Calibration checks may be performed on any of first CC 214, second CC 216, or third CC 218. Calibration checks may be performed on each of the CCs at the same time, or they may be performed on each CC individually at different times.

As an example, a first calibration check may be performed on first CC 214 shown in FIG. 2A. First CC 214 may fail the first calibration check, such as if first CC 214 has a break in the uplink and downlink reciprocity. Because first CC 214 has failed the first calibration check, UE 240, which is communicating with first CC 214 as its PCC, may not be receiving the high data volume benefits provided by the Massive MIMO network. As such, based on first CC 214 failing the calibration check, first CC 214 may be paired with another CC, such as second CC 216, as its PCC. This carrier aggregation communication configuration is illustrated in FIG. 2B. Here, UE 240 is paired with second CC 216 as its PCC and communicates with first CC 214 and third CC 218 as its SCCs. A reconfiguration message may be sent to UE 240 to pair UE 240 with second CC 216. In this way, UE 240 may continue to receive the high data volume benefits provided by the Massive MIMO network even though first CC 214 failed the first calibration check. In some cases, a calibration action may be taken to restore uplink and downlink beamforming reciprocity so that first CC 214 passes a subsequent calibration check.

A second calibration check may be performed on each of first CC 214, second CC 216, and third CC 218. The calibration check may be performed as part of a routine calibration check sequence having a predetermined amount of time between each calibration check. The second calibration check may also be performed as needed, such as a subsequent calibration check based on a CC failing the first calibration check or a calibration check performed in response to a calibration action taken on a CC that previously failed calibration. The second calibration check may be performed after the first calibration check.

First CC 214 may pass the second calibration check. Based on first CC 214 passing the second calibration check, the carrier aggregation communication configuration may transition back from the configuration shown in FIG. 2B to the configuration shown in FIG. 2A. That is, in response to first CC 214 passing the second calibration check, UE 240 may be instructed to pair with first CC 214 as its PCC, and it may again communicate with second CC 216 and third CC 218 as SCCs, as is illustrated in FIG. 2A. In this way, UE 240 experiences a greater chance of pairing with a calibrated CC as its PCC so that UE 240 is more likely to receive the high data benefits provided by the Massive MIMO network at any given time.

In some cases, a computing device communicating with base station 200 may determine which CC to pair with UE 240. The computing device may determine which CC to pair with UE 240 based on uplink capacity, bandwidth, or a calibration check performed on the CC.

For instance, in response to first CC 214 failing the first calibration check, the computing device may have the option of pairing UE 240 with second CC 216 as its PCC (as illustrated in FIG. 2B) or the option of pairing UE 240 with third CC 218 as its PCC. In the latter case, UE 240 may communicate with first CC 214 and second CC 216 as its SCCs. This example is not illustrated for simplicity in describing the present technology.

The computing device communicating with base station 200 may determine whether to pair UE 240 with second CC 216 or third CC 218 based on the uplink capacity of second CC 216 and third CC 218. Determining uplink capacity of each CC may be performed using methods generally known in the art, and may be performed continuously, periodically, as needed, or in response to an event, such as a failed calibration check. Simply stated, uplink capacity may be considered the maximum amount of data transferable by a CC. As used herein, a CC may have a greater uplink capacity when it has the ability to transfer more data than another CC before reaching its maximum amount of data throughput. Thus, if second CC 216 has a greater uplink capacity than third CC 218, then the computing device may pair UE 240 with second CC 216. Similarly, if third CC 218 has a greater uplink capacity than second CC 216, then the computing device may pair UE 240 with third CC 218.

In addition to or in lieu of using uplink capacity as a determinant when pairing UE 240 with a CC, the computing device may determine whether to pair UE 240 with second CC 216 or third CC 218 based on the bandwidth of second CC 216 and third CC 218. Like uplink capacity, bandwidth of a CC may be determined by any method known in the art. Bandwidth may be determined continuously, periodically, as needed, or in response to an event, such as a failed calibration check. Bandwidth generally describes a portion of a frequency spectrum. In the example previously used, a 20 MHz bandwidth may be a portion of the 2.5 GHz band. As used herein, a CC has a greater bandwidth when it is communicating across a greater portion of the band. For example, a CC communicating using a 20 MHz bandwidth has a "greater bandwidth" than a CC communicating across a 10 MHz bandwidth. Therefore, if second CC 216 has a greater bandwidth than third CC 218, then the computing device may pair UE 240 with second CC 216. Similarly, if third CC 218 has a greater bandwidth than second CC 216, then the computing device may pair UE 240 with third CC 218.

In some cases, a combination of uplink capacity and bandwidth may be used to determine which CC to pair with UE 240. This may be the case in 5G networks where CC bandwidths are variable. As an example, the computing device may determine that second CC 216 has a greater uplink capacity than third CC 218; however, third CC 218 may have a greater bandwidth than second CC 216. In this case, the computing device may pair UE 240 with third CC 218 as its PCC if the overall throughput experienced by UE 240 is greater because of greater bandwidth across which UE 240 is communicating with third CC 218 as its PCC. Put another way, UE 240 may be paired with the CC that maximizes data throughput based on the combination of the uplink capacity and the bandwidth associated with each CC.

Calibration checks may also be used to determine which CC to pair a UE to as its PCC. For example, the UE may be paired with a CC that has passed a calibration check so that the UE may receive the benefits of the Massive MIMO network. This may be done in response to a failed calibration check of a CC that the UE is currently paired to as its PCC. Using FIGS. 2A-2B, UE 240 is illustrated as paired with first CC 214 as its PCC (FIG. 2A). In response to first CC 214 failing a first calibration check, the computing device may pair UE 240 with second CC 216 as its PCC based on second CC 216 passing a calibration check (FIG. 2B). While not illustrated, UE 240 may be paired with third CC 218 based on third CC 218 passing a calibration check. Pairing UE 240 with third CC 218 may be in response to first CC 214 and second CC 216 failing a calibration check. In this way, the chances that UE 240 is paired with a calibrated CC at any given time is increased. Thus, UE 240 benefits by having an increased likelihood that it will be receiving Massive MIMO benefits when communicating in the network.

In some cases, UE device capability may be used to determine which CC to pair to the UE. For example, if a UE is a non-CA UE, meaning that the UE does not support carrier aggregation, the UE may not be paired with a CC as a PCC since this communication is not supported. As such, if a CC in a network does not pass a calibration check, those non-CA UEs communicating with the CC may not be instructed to communicate with another CC, e.g., they may continue communicating with the CC on its corresponding portion of the frequency spectrum, even though the CC has failed the calibration check. Alternatively, however, the computing device may determine whether the UE is capable of carrier aggregation, and based on determining that the UE is capable of carrier aggregation (e.g., the UE is a 2CA UE, 3CA UE, and so forth), then the computing device may pair the UE with another CC as its PCC. Using FIGS. 2A-2B, UE 240 is originally communicating with first CC 214 as its PCC in FIG. 2A. The computing device may determine whether UE 240 is capable of carrier aggregation. In response to first CC 214 failing the first calibration check, the computing device may pair UE 240 with second CC 216 as its PCC (shown in FIG. 2B) based on determining that UE 240 is capable of carrier aggregation. In this way, not all UEs in the network communicating with the portion of the frequency spectrum corresponding to first CC 214 are switched to frequency spectrum portions corresponding to second CC 216 or third CC 218. This may reduce the number of UEs that are communicating to second CC 216 and third CC 218, which in turn, allows for more CA-capable devices to pair with another CC as a PCC after first CC 214 fails a calibration check.

Figure 3A:
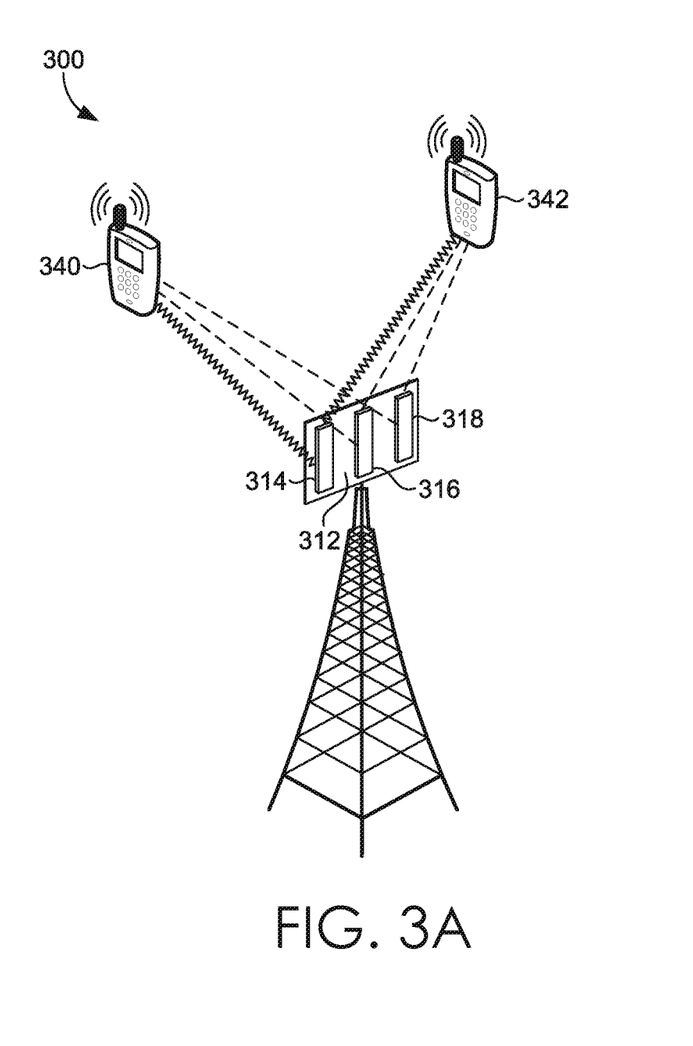
FIGS. 3A-3B illustrate example CCs having various carrier aggregation communication patterns with a plurality of UEs, in accordance with embodiments described herein.
Figure 3B:
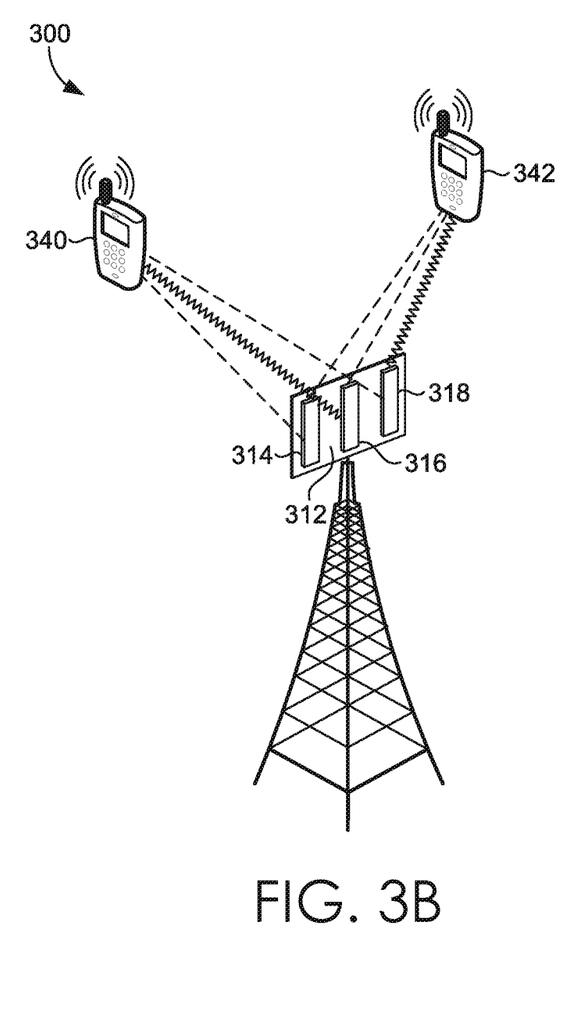

With reference now to FIGS. 3A-3B, these figures illustrate example CCs using various carrier aggregation communication patterns with a plurality of UEs. As illustrated, FIGS. 3A-3B show base station 300 having antenna 312. Antenna 312 includes first CC 314, second CC 316, and third CC 318. As with other example embodiments described, the CC arrangement is only illustrative in order to provide an example, but it may be in any other collective pattern, or they may be distributed in nature. UE 340 and UE 342 are shown in communication with each of the CCs. The zig-zag line is an illustrative example of communicating with a CC as a PCC. For example, in FIG. 3A both UE 340 and UE 342 are illustrated as communicating with first CC 314 as their PCC, while in FIG. 3B, UE 340 is shown communicating with second CC 216 as its PCC and UE 342 is shown communicating with third CC 218 as its PCC. Although UE 340 and UE 342 are illustrated as single UEs, each may themselves be representative of a plurality of UEs. For example, UE 340 may represent a single UE or may represent tens, hundreds, or even thousands or more UEs. UE 342 may likewise be representative of a plurality of UEs in the network.

Calibration checks may be performed to determine whether UEs are receiving the high data benefits of the Massive MIMO network. If a CC fails calibration, then those UEs communicating with the CC as a PCC may be paired with other CCs to continue receiving the high data volumes communicated using the PCC. In response to a CC failing calibration, a plurality of UEs may be paired with one CC while another plurality of UEs may be paired with another CC. For instance, UE 340 and UE 342 may each be paired with first CC 314 as their PCC, as shown in FIG. 3A. First CC 314 may undergo a calibration check. If first CC 314 fails the first calibration check, UE 340 may be paired with second CC 316 as its PCC, as shown in FIG. 3B. However, in response to first CC 314 failing the first calibration check, UE 342 may be paired with third CC 318. The plurality of UEs, represented by UE 340 and UE 342, may be split between different CCs so as to maximize bandwidth and uplink capacity.

Figure 4:
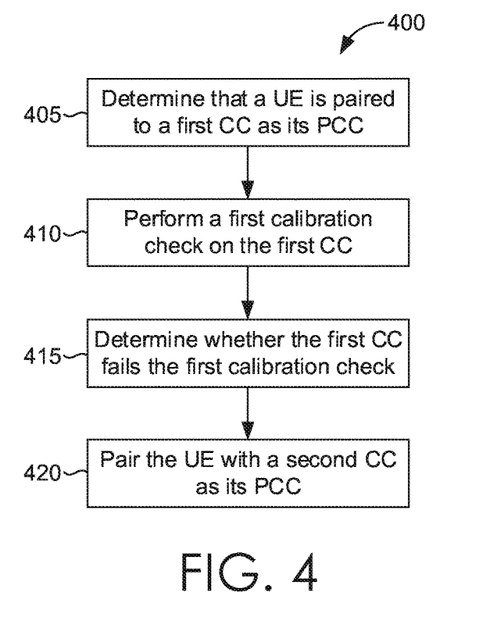
FIG. 4 illustrates an example method for improving primary component carrier (PCC) pairing in a Massive multiple-input multiple-output (MIMO) network, in accordance with embodiments described herein.

Turning now to FIG. 4, an example method 400 for improving PCC pairing in a Massive MIMO network is provided. At block 405, it is determined that a UE is paired to a first CC as a PCC. At block 410, a first calibration check is performed on the first CC. At block 415, it is determined whether the first CC fails the first calibration check. At block 420, the UE is paired with a second CC as its PCC. In some cases, the UE is paired with the second CC based on the first CC failing the first calibration check. Blocks 405, 410, 415, and 420 may be performed by a computing device in communication with a base station. The base station may have at least three CCs that include the first CC, the second CC, and a third CC.

In an embodiment, method 400 may also include performing a second calibration check on the first CC after the UE has been paired with the second CC as its PCC. It may be determined that the first CC passes the second calibration check. Based on the first CC passing the second calibration check, the UE may be paired with the first CC as its PCC. As such, prior to the first CC failing the first calibration check, the UE may communicate with each of the second CC and the third CC as its SCCs. After the first CC fails the first calibration check and prior to the first CC passing the second calibration check, the UE may communicate with the second CC as the PCC, and may communicate with each of the first CC and the third CC as SCCs. However, after the first CC passes the second calibration check, the UE may communicate with the first CC as its PCC, and may communicate with each of the second CC and the third CC as SCCs.

Method 400 might also include determining at least one of an uplink capacity of one or more of the at least three CCs and a bandwidth of one or more of the at least three CCs. In some cases, pairing the UE with the second CC as the PCC may be based on at least one of the uplink capacity of the second CC and the bandwidth of the second CC. Additionally, method 400 may include determining whether the UE is capable of carrier aggregation. Based on determining that the UE is capable of carrier aggregation, the UE may be paired with the second CC as the PCC.

Figure 5:
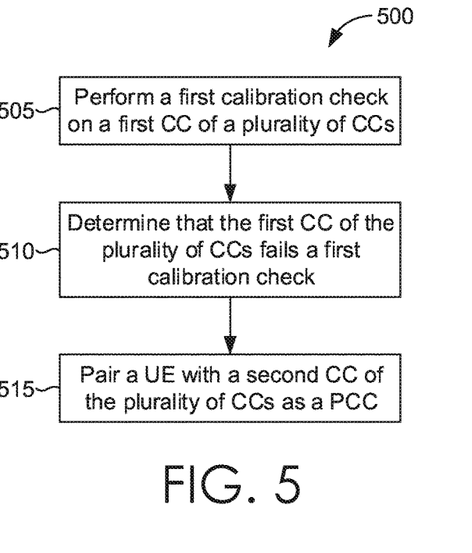
FIG. 5 illustrates another example method for improving PCC pairing in a Massive MIMO network, in accordance with embodiments described herein.

FIG. 5 provides another example method 500 for improving PCC pairing in a Massive MIMO network. At block 505, a first calibration check is performed on a first CC of a plurality of CCs. At block 510 it may be determined that the first CC of the plurality of CCs fails a first calibration check. At block 515, a UE may be paired with a second CC of the plurality of CCs as a PCC. In some cases, the UE may be paired with the second CC as its PCC based on the first CC failing the first calibration check.

In some cases, an uplink capacity of the second CC is determined. The UE may be paired with the second CC based on the uplink capacity of the second CC. Alternatively or in addition to determining the uplink capacity, a bandwidth of the second CC may be determined. The UE may be paired with the second CC based on the bandwidth. In some cases, the UE may be paired with the second CC based on a combination of the uplink capacity and bandwidth of the second CC. Further, the UE may be paired with the second CC as the PCC based on determining that the UE is capable of carrier aggregation. In some cases, the UE may be paired with the second CC as its PCC based on a number of UEs communicating with the second CC.

Method 500 may also include determining that the first CC passes a second calibration check, and pairing the UE with the first CC based on the first CC passing the second calibration check. The second calibration check may be performed after the first calibration check.

Figure 6:
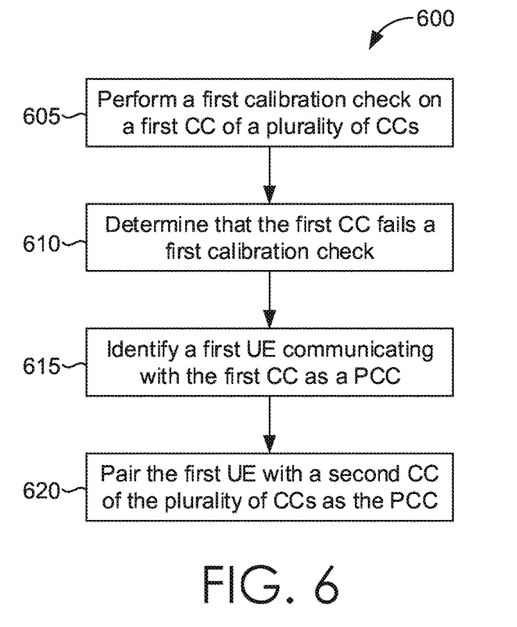
FIG. 6 illustrates another example method for improving PCC pairing in a Massive MIMO network, in accordance with embodiments described herein.

FIG. 6 provides another example method 600 for improving PCC pairing in a Massive MIMO network. At block 605, a first calibration check is performed on a first CC of a plurality of CCs. At block 610, it is determined that the first CC fails a first calibration check. At block 615, a first UE communicating with the first CC as a PCC is identified. At block 620, the first UE is paired with a second CC of the plurality of CCs as the PCC. In some cases, the UE may be paired with the second CC based on the first CC failing the first calibration check.

Method 600 may also include performing the first calibration check on the second CC and determining that the second CC passes the first calibration check. Based on the second CC passing the first calibration check, the first UE may be paired with the second CC. In addition to or in lieu of determining that the second CC passes the first calibration check, an uplink capacity of the second CC may be determined, and the first UE may be paired with the second CC as its PCC based on the uplink capacity. In addition to or in lieu of determining that the second CC passes the first calibration check and determining the uplink capacity of the second CC, a bandwidth of the second CC may be determined, and the first user equipment may be paired with the second CC as its PCC based on the bandwidth.

Additionally, a second UE communicating with the first CC as a PCC may be identified. The second UE may be paired with a third CC of the plurality of CCs as the primary CC. The second UE may be paired with the third CC as its PCC based on the first CC failing the first calibration check, and the second UE may be paired with the third CC as its PCC based on the first UE being paired with the second CC. In some cases, the first UE may be paired with the second CC as its PCC and the second UE may be paired with the third CC as its PCC based on a number of UEs communicating with the second CC and the third CC.

Method 600 may also include determining that the first CC passes a second calibration check after pairing the first UE with the second CC. Based on the first CC passing the second calibration check, the first UE may be paired with the first CC as the PCC.

Embodiments of the technology may be embodied as, among other things, a method, a system, or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, or various other network devices. Network switches, routers, and related components are conventional in nature, as are methods of communicating with the same. By way of example, and not limitation, computer-readable media may include computer storage media or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

Figure 7:
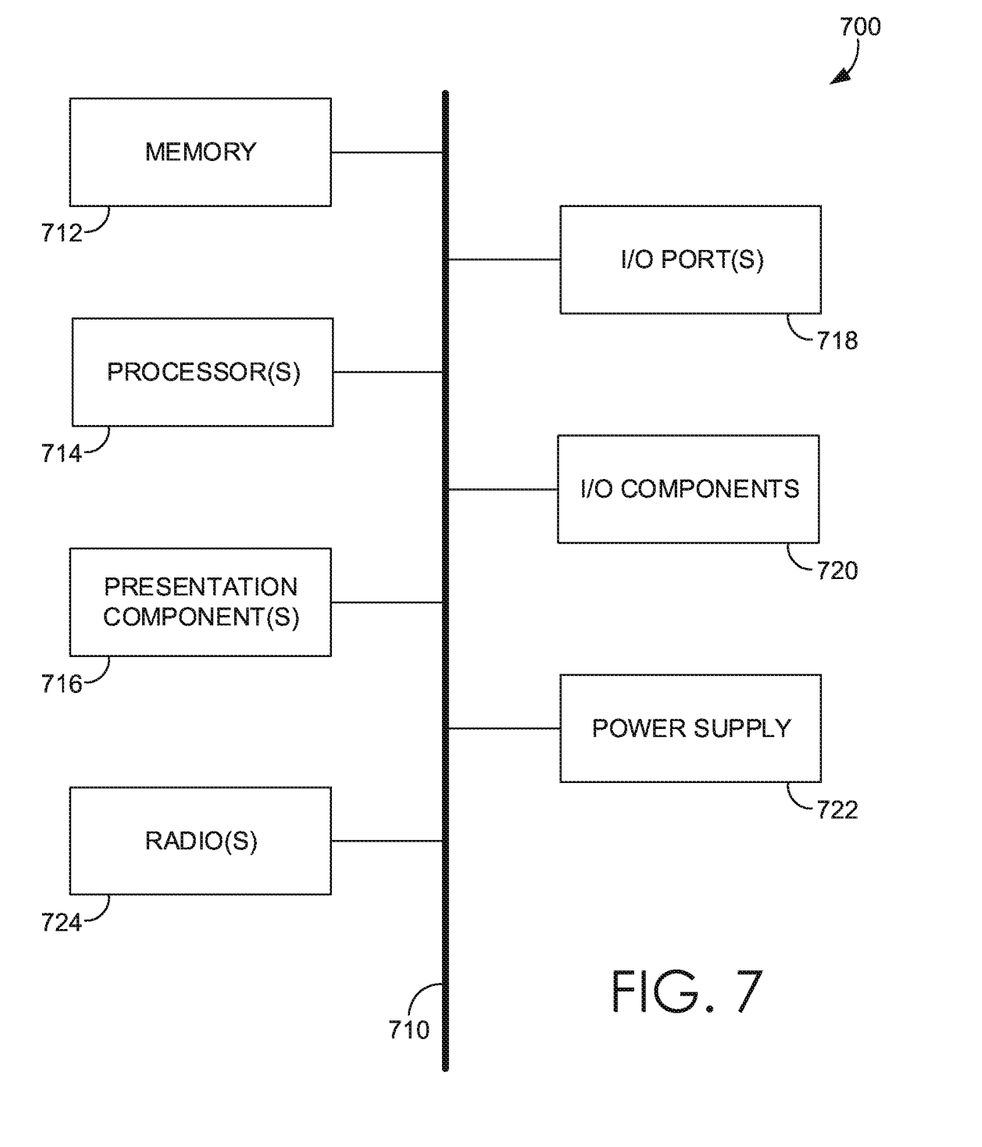
FIG. 7 illustrates an example computing environment suitable for use with the present disclosure.

Turing now to FIG. 7 an exemplary computing environment 700 suitable for practicing embodiments of the present technology is provided. Computing environment 700 is but one example, and is not intended to suggest any limitation as to the scope of use or functionality of the embodiments discussed herein. The computing environment 700 should not be interpreted as having any dependency or requirement relating to any one or a combination of components illustrated. It should be noted that although some components in FIG. 7 are shown in the singular, they may be plural. For example, the computing environment 700 might include multiple processors or multiple radios. As shown in FIG. 7, computing environment 700 includes a bus 711 that directly or indirectly couples various components together, including memory 714, processor(s) 716, presentation component(s) 718 (if applicable), radio(s) 720, input/output (I/O) port(s) 722, input/output (I/O) component(s) 724, and power supply 726. More or fewer components are possible and contemplated, including in consolidated or distributed form.

Memory 714 may take the form of memory components described herein. Thus, further elaboration will not be provided here, but it should be noted that memory 714 may include any type of tangible medium that is capable of storing information, such as a database. A database may be any collection of records, data, or information. In one embodiment, memory 714 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 718 may include a display, a speaker, or other components that may present information (e.g., a display, a screen, a lamp (LED), a graphical user interface (GUI), or even lighted keyboards) through visual, auditory, or other tactile cues.

Radio 720 may facilitate communication with a network, and may additionally or alternatively facilitate other types of wireless communications, such as Wi-Fi, WiMAX, LTE, NR, VoIP communications, or the like. In various embodiments, the radio 720 may be configured to support multiple technologies, or multiple radios may be configured and utilized to support multiple technologies.

The input/output (I/O) ports 722 may take a variety of forms. Exemplary I/O ports may include a USB jack, a stereo jack, an infrared port, a firewire port, other proprietary communications ports, and the like. Input/output (I/O) components 724 may comprise keyboards, microphones, speakers, touchscreens, or any other item usable to directly or indirectly input data into the computing environment 700.

Power supply 726 may include batteries, fuel cells, or any other component that may act as a power source to supply power to the computing environment 700 or to other network components, including through one or more electrical connections or couplings. Power supply 726 may be configured to selectively supply power to different components independently or concurrently.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A system for improving pairing of user equipment to a primary component carrier in a Massive multiple-input multiple-output (MIMO) network, the system comprising:
   one or more base stations having a plurality of nodes communicating with a first user equipment and a second user equipment via a plurality of component carriers, wherein the plurality of nodes comprises at least a first node communicating via a first component carrier, a second node communicating via a second component carrier, and a third node communicating via a third component carrier; and
   a computing device in communication with the one or more base stations, wherein the computing device:
      determines that the first user equipment and the second user equipment are paired to the first node of the plurality of nodes, the first node communicating via the first component carrier as a primary component carrier for the first user equipment and the second user equipment;
      performs a first calibration check on the first node communicating via the first component carrier, wherein the first calibration check determines whether there is a break in uplink or downlink reciprocity;
      in response to the first node communicating via the first component carrier failing the first calibration check, pairs the first user equipment with the second node communicating via the second component carrier as a primary component carrier to the first user equipment; and
      in response to each of (i) the first node communicating via the first component carrier failing the first calibration check and (ii) an uplink capacity of the third node communicating via the third component carrier being greater than an uplink capacity of the second node communicating via the second component carrier, pairs the second user equipment with the third node communicating via the third component carrier as a primary component carrier to the second user equipment.

2. The system of claim 1, wherein the computing device further:
   performs a second calibration check on the first component carrier after pairing the first user equipment with the second component carrier as the primary component carrier to the first user equipment;
   determines that the first component carrier passes the second calibration check;
   based on the first component carrier passing the second calibration check, pairs the first user equipment with the first component carrier as the primary component carrier to the first user equipment.

3. The system of claim 2, wherein:
   prior to the first component carrier failing the first calibration check, the first user equipment communicates with each of the second component carrier and the third component carrier as secondary component carriers;

after the first component carrier fails the first calibration check and prior to the first component carrier passing the second calibration check, the first user equipment communicates with the second component carrier as the primary component carrier to the first user equipment, and communicates with each of the first component carrier and the third component carrier as secondary component carriers; and after the first component carrier passes the second calibration check, the first user equipment communicates with the first component carrier as the primary component carrier to the first user equipment, and communicates with each of the second component carrier and the third component carrier as secondary component carriers.

4. The system of claim 1, wherein the computing device further determines at least one of:
    an uplink capacity of one or more of the at least three component carriers; and
    a bandwidth of one or more of the at least three component carriers.

5. The system of claim 4, wherein pairing the first user equipment with the second component carrier as the primary component carrier to the first user equipment is based on at least one of the uplink capacity of the second component carrier and the bandwidth of the second component carrier.

6. The system of claim 1, further comprising determining whether the first user equipment is capable of carrier aggregation, wherein the first user equipment is paired with the second component carrier as the primary component carrier to the first user equipment based on determining that the first user equipment is capable of carrier aggregation.

7. Non-transitory computer storage media storing computer-usable instructions that when executed by a processor cause operations comprising:
    performing a first calibration check on a first node configured to communicate to a first user equipment, a second user equipment, and a third user equipment via a first component carrier, wherein the first calibration check determines whether there is a break in uplink or downlink reciprocity;
    determining that the first node fails the first calibration check;
    in response to the first node communicating via the first component carrier failing the first calibration check, pairing the first user equipment with a second node communicating via a second component carrier as a primary component carrier to the first user equipment; and
    in response to each of (i) the first node communicating via the first component carrier failing the first calibration check and (ii) an uplink capacity of a third node communicating via a third component carrier being greater than an uplink capacity of the second node communicating via the second component carrier, pairing the second user equipment with the third node communicating via the third component carrier as a primary component carrier to the second user equipment.

8. The non-transitory computer storage media of claim 7, further comprising:
    determining that the first component carrier passes a second calibration check, the second calibration check performed after the first calibration check; and
    based on the first component carrier passing the second calibration check, pairing the first user equipment and the second user equipment with the first component carrier as the primary component carrier to each of the first user equipment and the second user equipment.

9. The non-transitory computer storage media of claim 7, further comprising determining an uplink capacity of the second component carrier, wherein the first user equipment is paired with the second component carrier as the primary component carrier to the first user equipment based on the uplink capacity.

10. The non-transitory computer storage media of claim 7, further comprising determining a bandwidth of the second component carrier, wherein the first user equipment is paired with the second component carrier as the primary component carrier to the first user equipment based on the bandwidth.

11. The non-transitory computer storage media of claim 7, further comprising determining whether the first user equipment is capable of carrier aggregation, wherein the first user equipment is paired with the second component carrier as the primary component carrier to the first user equipment based on determining that the first user equipment is capable of carrier aggregation.

12. A method for improving pairing of user equipment to a primary component carrier in a Massive multiple-input multiple-output (MIMO) system, the method comprising:
    performing a first calibration check on a first node configured to communicate with a first user equipment, a second user equipment, and a third user equipment via a first component carrier of a plurality of component carriers, wherein the first node of a plurality of nodes communicates via the first component carrier as the primary component carrier for each of the first user equipment, the second user equipment, and the third user equipment, wherein the first calibration check determines whether there is a break in uplink or downlink reciprocity;
    determining that the first component carrier communicating via the first component carrier fails the first calibration check;
    in response to the first component carrier failing the first calibration check, pairing the first user equipment with a second component carrier of the plurality of component carriers as the primary component carrier to the first user equipment based on an uplink capacity of the second component carrier and a bandwidth of the second component carrier, wherein the uplink capacity of the second component carrier is less than an uplink capacity of a third component carrier, and a bandwidth of the second component carrier is greater than a bandwidth of the third component carrier; and
    in response to each of (i) the first component carrier failing the first calibration check and (ii) an uplink capacity of a third component carrier being greater than the uplink capacity of the second component carrier, pairing the second user equipment with the third component carrier of the plurality of component carriers as the primary component carrier to the second user equipment.

13. The method of claim 12, further comprising:
    determining that the first component carrier passes a second calibration check after pairing the first user equipment with the second component carrier as the primary component carrier to the first user equipment; and
    based on the first component carrier passing the second calibration check, pairing the first user equipment with the first component carrier as the primary component carrier to the first user equipment.

14. The method of claim 12, further comprising:
performing the first calibration check on the second component carrier; and
determining that the second component carrier passes the first calibration check, wherein the first user equipment is paired with the second component carrier as the primary component carrier based on determining that the second component carrier passes the first calibration check.

15. The method of claim 12, further comprising determining whether the first user equipment is capable of carrier aggregation, wherein pairing the first user equipment with the second component carrier as the primary component carrier is further based on determining that the first user equipment is capable of carrier aggregation.

* * * * *